April 18, 1933. S. S. SVENDSEN 1,904,762
PRODUCTION OF ALUMINUM CHLORIDE AND ALUMINA
Filed May 13, 1927
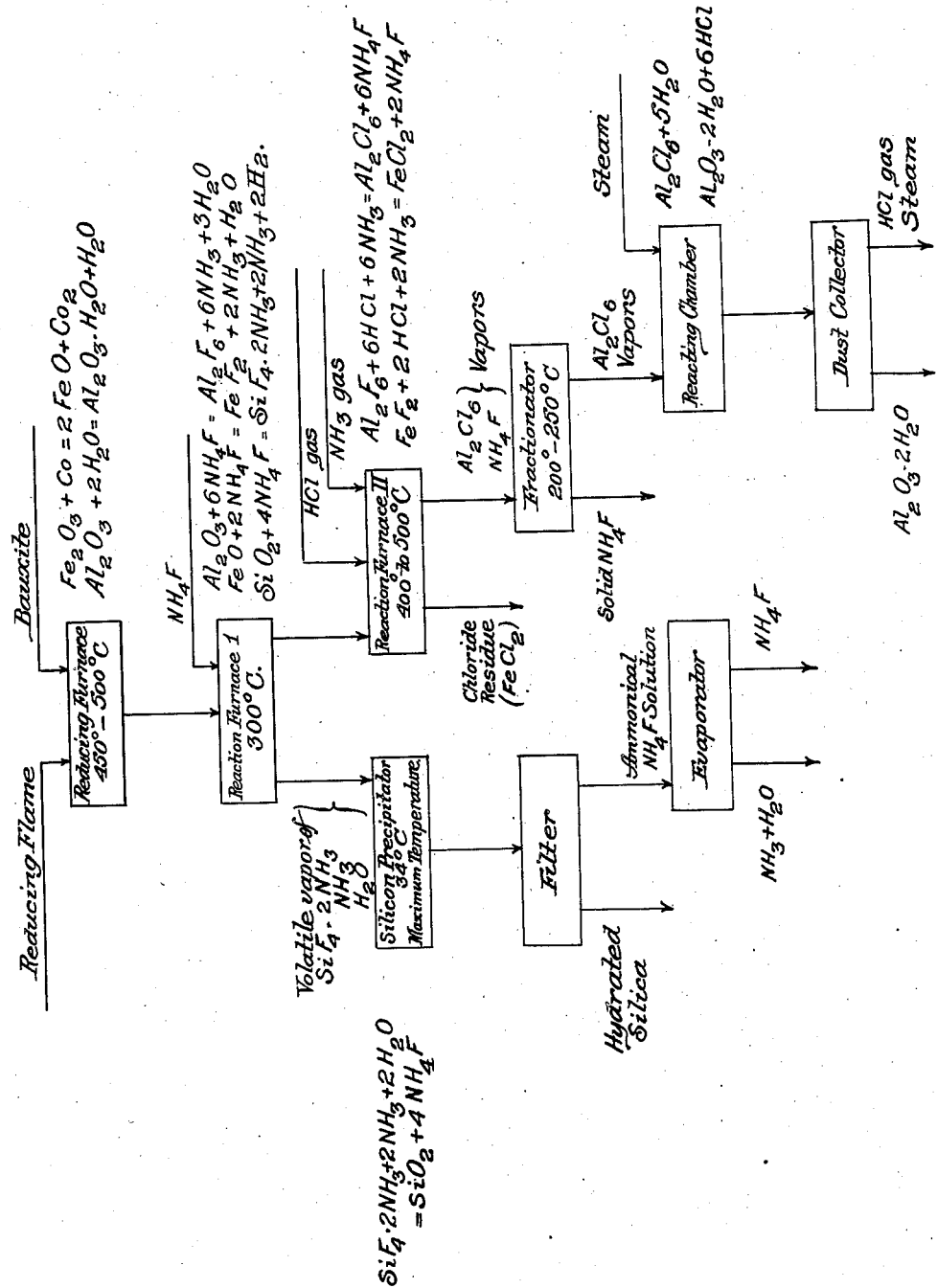
Inventor:
Svend S. Svendsen,
By Benjamin Schneider
Atty Patented Apr. 18, 1933

1,904,762

UNITED STATES PATENT OFFICE

SVEND S. SVENDSEN, OF CHICAGO, ILLINOIS, ASSIGNOR TO CLAY REDUCTION COMPANY, OF CHICAGO, ILLINOIS, A CORPORATION OF ILLINOIS

PRODUCTION OF ALUMINUM CHLORIDE AND ALUMINA

Application filed May 13, 1927, Serial No. 191,267, and in Norway October 25, 1926.

This invention relates to the production of aluminum chloride and alumina from aluminum compounds. The invention further relates to the production of hydrated silica and a residue high in soluble potash.

According to the invention raw material containing aluminum, and ordinarily silica, and sometimes potassium oxides, is converted into ammonia - silicon - fluorine compounds and metallic fluorides, preferably by the action of ammonium fluoride or bifluoride. On heating, the ammonia-silicon-fluorine compounds, together with titanium compounds and vanadium compounds, if any, sublime and the metallic fluorides, particularly those of aluminum and potassium remain. Ammonia is evolved and is collected. The sublimated ammonia-silicon-fluorine compounds are treated with water and ammonia, yielding hydrated silica and ammonium fluoride which is washed out and recovered. The metallic fluorides are treated with dry hydrochloric acid gas and ammonia at high temperature, thereby converting them into chlorides. Aluminum chloride and ammonium fluoride are volatilized and separated, the ammonium fluoride being recovered. In this reaction the hydrogen chloride gas is the effective agent in converting the metallic fluorides into chloride. The ammonia is effective in converting the liberated hydrogen fluoride into ammonium fluoride.

The aluminum chloride may be converted into alumina by the action of water, if desired; hydrochloric gas is evolved and is recovered.

The ammonia, ammonium fluoride and hydrogen chloride evolved at different phases of the process are reutilized in the process, being augmented to replace wastage. It is necessary to supply a substantial quantity of hydrochloric acid gas for each run of the process since chlorine is taken out of the reaction in the residual metallic chlorides and also in the aluminum chloride, if it is not converted into alumina.

Suitable raw materials for the process are bauxite, particularly white bauxite, and clay with low content of iron oxide; lime and soda. China clay and fire clay are suitable. Clays containing undecomposed or partly decomposed orthoclase feldspar may be used. These clays entail an increased acid consumption which is offset by the production of potash fertilizer as a by-product.

Bauxite, especially red bauxite, is preferably given a preliminary reduction with reducing gas, such as producer gas or water gas to convert the ferric compounds into ferrous compounds. White bauxite usually does not require such a reduction. White bauxite rich in silica is particularly adapted for this process since the silica has no objectionable action and is converted into highly valuable hydrated silica.

The invention will be more fully understood from the following detailed examples:

*Example I.*—Dried clay containing feldspar is mixed, in hollanders, with ammonium fluoride solution containing sufficient fluorine to convert the silica into silicon-diammino tetrafluoride ($SiF_4(NH_3)_2$), and the metallic oxides into fluorides. The mixture is heated to between 34° and 100° C. The ammonium fluoride is thereby dissociated into ammonia and ammonium bifluoride; the latter attacks the clay, reforming normal fluoride which is again decomposed. Ammonia gas is evolved and recovered. The final result of this reaction is principally ammonium silicofluoride (($NH_4)_2SiF_6$), metallic fluorides and metallic oxides.

The mixture is evaporated to dryness; the ammonium silicofluoride gives off one-third of its fluorine content, which completely converts the metallic oxides into fluorides. The ammonium silicofluoride is thereby converted into silicon fluoride ammonia

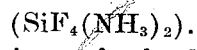
$$(SiF_4(NH_3)_2).$$

The mixture is now further heated to about 300° C. thereby volatilizing the volatile fluorides, principally silicon diammino tetrafluoride. Fluorides of titanium and vanadium, if such metals are present, also volatilize leaving the other metallic fluorides as a residue. The volatile fluorides are collected, cooled and decomposed by addition of water and ammonia at a temperature maintained below 34° C., to yield ammonium fluoride and hydrated silica. The ammonium fluoride is removed by water and is recovered. After the volatilization of the volatile fluorides the temperature of the metallic fluorides is raised to about 400° to 500° C. and a reducing gas is passed through same in order to displace any volatile fluorides and to reduce any ferric compounds which may be present. If ferric compounds were not reduced, ferric chloride would be formed in the next stage of the process and would contaminate the aluminum chloride and alumina derived therefrom. A mixture of ammonia gas and hydrogen chloride gas free from moisture, free oxygen and carbon dioxide is now introduced into the fluorides. These gases react on the metallic fluorides forming metallic chlorides and ammonium fluoride. The aluminum chloride and the ammonium fluoride distill off leaving a residue of mixed chlorides including potassium chloride which is well suited for use as a fertilizer without further processing.

The mixture of vaporized ammonium fluoride and aluminum chloride is cooled to between 200° and 300° C., whereupon the ammonium fluoride solidifies and falls out. The aluminum chloride is cooled below its boiling point (187° C.) and is condensed and collected.

The aluminum chloride may be converted into alumina, if desired. The hydrolysis may suitably be effected by steam, thereby producing aluminum hydroxide with two molecules of water and hydrochloric acid gas which is recovered.

The alumina is now calcined, losing one molecule of water at about 300° C. and the second molecule at about 1000° C.

The hydrochloric acid gas is dried by sulfuric acid, the diluted sulfuric acid being used for the production of hydrochloric acid gas which is consumed in the process.

The quantities of reagents used and products produced will naturally depend upon the quantity and composition of the initial clay. For example, assuming 120 tons of clay of the composition

| | |
|---|---|
| Alumina | 25% |
| Silica | 60% |
| Ferrous oxide | 3% |
| Lime | 2% |
| Soda | 4% |
| Potash | 6% | then a solution containing 262 tons of ammonium fluoride will be required to convert the silicon into siliconfluoride-ammonia and the metallic oxides into metallic fluorides in the next phase of the process. In this part of the process 79.2 tons of ammonia gas are evolved and 165.6 tons of silicon fluoride ammonia are volatilized. The siliconfluoride-ammonia is decomposed by 40.8 tons of ammonia and 172.8 tons of water, forming 177.6 tons of ammonium fluoride and hydrated silica. The ammonium fluoride is washed out of the hydrated silica by water and the silica is dried, yielding 93.6 tons.

For the conversion of the metallic fluorides into chlorides, 82 tons of hydrogen chloride gas and 38.4 tons of ammonia gas are required. The residue of mixed chlorides is 31.2 tons containing 7.2 tons or 23% potash (as $K_2O$).

The ammonium fluoride here recovered amounts to about 81.2 tons and together with the ammonium fluoride recovered from the hydrated silica substantially equals the ammonium fluoride used in the first step of the process. The yield of aluminum chloride is about 78 tons.

The hydrolysis of this amount of aluminum chloride requires about 26.5 tons of steam and yields 64.4 tons of hydrogen chloride gas which is dried by sulphuric acid and is used in the conversion of another batch of metallic fluorides into chlorides being augmented by about 17.6 tons hydrochloric acid gas, which corresponds to the amount required for the formation of the residual metallic chlorides.

The amounts of ammonia gas required for the formation of the hydrated silica and the conversion of metallic fluoride into chlorides are substantially equal to the ammonia evolved in the first part of the process and it is therefore necessary only to replace wastage. Wastage of fluorine can be compensated by addition of fluor-spar to the mixture.

*Example II.*—Bauxite is finely ground, reduced if necessary and a solution of ammonium fluoride is added and the mixture heated above 34° C.; for example, between 34° C. and 100° C. The water is then evaporated and the silica is converted into ammonium silicofluoride and any titanic acid present is also converted into ammonium titanic fluoride. The ammonium fluoride is dissociated into ammonia and ammonium bifluoride above 34° C. and the bifluoride attacks the metallic oxides and the silica. The mixture is now heated to about 300° C. and the reaction is completed, the metallic oxides being converted into fluorides and ammonium silicofluoride being converted into silicon-diammino tetrafluoride

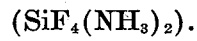

The ammonia evolved is collected.

On completion of this reaction the temperature is raised to about 300° C. to volatilize the volatile fluorides, principally the silicon-diammino tetrafluoride, titanium and vanadium fluorides, etc. The volatile fluorides are completely displaced by passage of reducing gas through the residue. The reducing gas may suitably be producer or water gas carefully treated for removal of free oxygen, water and carbon dioxide. The gas is passed through while the mass is at an incipient red heat, for example, between 400° and 500° C. The ferric compounds are thereby reduced so that no volatile ferric chloride is produced in the later part of the process. Ferric chloride would otherwise contaminate the aluminum chloride and the alumina derived therefrom.

The volatilized fluorides, principally silicon-diammino tetrafluoride are precipitated by cooling and are treated with aqueous ammonia below about 34° C. being thereby converted into hydrated silica and ammonium fluoride. The ammonia used may be part of that evolved in the first part of the process. The ammonium fluoride is washed out with water and is used in the first step of a subsequent batch. The hydrated silica is dried to give a commercial product.

The unvolatilized fluorides, consisting principally of aluminum fluoride, are treated at between 400° and 500° C. with an equimolecular mixture of hydrogen chloride gas and ammonia vapor from which moisture, free oxygen and carbon dioxide have been eliminated. The metal fluorides are thereby converted into chlorides and ammonium fluoride is produced. The ammonium fluoride and the aluminum chloride volatilize. The former is precipitated by cooling to between 200° and 300° C. and the latter is condensed by cooling it below its boiling point.

As in Example I the ammonium fluoride used in the process is recovered completely except for mechanical losses and the ammonia evolved is reused in the same run. In general, a loss of hydrogen chloride is involved in converting the residual metallic compounds into chlorides.

Amounts of reagents which are used and the amount of reagents and products recovered depend upon the composition of the aluminous containing raw material as will be completely understood from Example I.

While it is preferred to use ammonium fluoride or bifluoride for the production of fluorides in the reaction mass it must be understood that it is not intended to limit the process thereto since such production can be effected by the use of hydrofluoric acid or in other known manner. The method described has, however, outstanding advantages. For example, the production of the annoying and poisonous fumes of the hydrofluoric acid and silicon fluoride are thereby avoided. Furthermore, ammonium fluoride has only a slightly corrosive action on metals and does not attack the skin. An outstanding advantage in the use of ammonium fluoride is that it is regenerated completely, except for mechanical losses, during the process.

Although the present invention has been described in connection with the details of specific examples thereof, it is not intended that such details shall be regarded as limitations upon the scope of the invention, except in so far as included in the accompanying claims.

The accompanying flow sheet will serve to more clearly illustrate the process.

I claim:

1. The method of producing anhydrous aluminum chloride which consists in treating aluminum fluoride with hydrogen chloride and ammonia gas.

2. The method of producing anhydrous aluminum chloride which consists in treating aluminum oxide with a reactive fluoride, thereby forming aluminum fluoride and treating the fluoride with hydrogen chloride and ammonia gas.

3. The method of producing aluminum chloride from material containing aluminum oxide and silica, which consists in treating said oxides with a reactive fluoride, thereby forming corresponding fluorides, volatilizing the silicon as a fluorine compound, and treating the aluminum fluoride with hydrogen and a volatile alkali, thereby forming aluminum chloride and separating it from impurities by distillation.

4. The method of producing aluminum chloride from material containing aluminum oxide and silica, which consists in treating said oxides with ammonium fluoride, thereby forming ammonia-silicon-fluorine compounds and aluminum fluoride, heating the mixture to volatilize the ammonia-silicon-fluorine compounds, and reacting on the aluminum fluoride with hydrogen chloride in the presence of a volatile alkali, thereby forming aluminum chloride.

5. The method of producing aluminum chloride from material containing oxides of silicon, aluminum and other metals which consists in treating said material with ammonium fluoride to form ammonia-silicon-fluorine compounds, aluminum fluorides and fluorides of other metals, heating the mixture to volatilize the ammonia-silicon-fluorine compounds, and subjecting the fluorides of aluminum and other metals to the action of hydrogen chloride in the presence of a volatile alkali, thereby forming corresponding anhydrous chlorides.

6. The method of producing aluminum chloride from material containing oxides of silicon, aluminum and other metals which consists in reacting on said material with ammonium fluoride to form ammonia-silicon-fluorine compounds, aluminum fluorides and fluorides of other metals, heating the mixture to volatilize the ammonia-silicon-fluorine compounds, heating the fluorides of aluminum and other metals with ammonia and hydrogen chloride acid to convert the fluorides into chlorides and to produce ammonium fluoride and volatilize aluminum chloride and ammonium fluoride, cooling to condense the ammonium fluoride and further cooling to condense the aluminum chloride.

7. The method of producing aluminum chloride from material containing oxides of silicon, aluminum and other metals which consists in treating said material with ammonium fluoride, heating the mixture to produce ammonia-silicon-fluorine compounds and metallic fluorides and to volatilize the ammonia-silicon-fluorine compounds from the metallic fluorides, heating the fluorides of aluminum and other metals with ammonia and hydrogen chloride to convert the fluorides into chlorides and separating the aluminum chloride from the other chlorides by distillation.

8. The method of producing aluminum chloride from material containing oxides of silicon, aluminum and other metals which consists in treating said material with ammonium fluoride, heating the mixture to produce ammonia-silicon-fluorine compounds and metallic fluorides and to volatilize the ammonia-silicon-fluorine compounds from the metallic fluorides, heating the fluorides of aluminum and other metals with ammonia and hydrogen chloride to convert the fluorides into chlorides and to produce ammonium fluoride.

9. The method of treating material containing oxides of silicon, aluminum and potassium with ammonium fluoride to convert such oxides into useful compounds and recover the ammonium fluoride which consists in mixing the material with a solution of ammonium fluoride, heating above 34° C., evaporating the water and heating to about 300° C. to produce and volatilize ammonia-silicon-fluorine compounds, raising the temperature of the residue to 400°–500° C. and treating with anhydrous hydrogen chloride gas and ammonia thereby converting the metal fluorides into chlorides, producing ammonium fluoride, and volatilizing the aluminum chloride and ammonium fluoride, condensing the ammonium fluoride by cooling and condensing the aluminum chloride by further cooling.

10. The method of treating material containing oxides of silicon, aluminum, iron and potassium with ammonium fluoride to convert such oxides into useful compounds and recover the ammonium fluoride which consists in mixing the material with a solution of ammonium fluoride, heating above 34° C., evaporating the water and heating to about 300° C. to produce and volatilize ammonia-silicon-fluorine compounds, raising the temperature of the residue to 400°–500° C., reducing with an anhydrous reducing gas and treating with anhydrous hydrogen chloride gas and ammonia thereby converting the metal fluorides into chlorides, producing ammonium fluoride, and volatilizing the aluminum chloride and ammonium fluoride, condensing the ammonium fluoride by cooling and condensing the aluminum chloride by further cooling.

11. The method of producing anhydrous aluminum chloride which comprises treating aluminum fluoride with hydrogen chloride gas at a temperature of at least about 400° C. in the presence of a volatile agent capable of reacting with the hydrogen fluoride formed.

12. The method of producing anhydrous aluminum chloride which comprises treating aluminum fluoride with a mixture of hydrogen chloride and ammonia gas.

13. The method of producing anhydrous aluminum chloride which comprises reacting on aluminum oxide with a reactive fluoride to form aluminum fluoride and treating the fluoride with hydrogen chloride and ammonia gas while heating to a temperature of 400° to 500° C.

14. The method of producing anhydrous aluminum chloride which comprises reacting on aluminum oxide with a reactive fluoride to form aluminum fluoride and treating the fluoride with equimolecular proportions of hydrogen chloride and ammonia gas while heating to a temperature of 400° to 500° C.

15. The method of producing aluminum chloride from material containing oxides of silicon, aluminum and other metals which comprises reacting on said material with ammonium fluoride to form ammonia-silicon-fluorine compounds, aluminum fluorides and fluorides of other metals, heating the mixture to volatilize the ammonia-silicon-fluorine compounds, treating the fluorides of aluminum and other metals with ammonia and hydrogen chloride at a temperature of 400° to 500° C. to convert the fluorides into chlorides and separating the aluminum chloride from the other chlorides by volatilization.

16. The method of producing aluminum chloride from material containing oxides of silicon, aluminum and other metals which comprises reacting on said material with ammonium fluoride to form ammonia-silicon-fluorine compounds, aluminum fluorides and fluorides of other metals, heating the mixture to volatilize the ammonia-silicon-fluorine compounds, heating the residual fluorides with ammonia and hydrogen chloride at a temperature of 400° to 500° C., thereby converting the fluorides into chlorides, producing ammonium fluoride, and volatilizing aluminum chloride and ammonium fluoride, cooling the evolved vapors to condense the ammonium fluoride, and further cooling to condense the aluminum chloride.

17. The method of producing a purified anhydrous aluminum chloride from material containing iron and aluminum which comprises subjecting the material to the action of a reactive fluoride to convert the metallic content thereof to fluorides, heating the converted material in the presence of an anhydrous reducing gas and treating it with hydrogen chloride at an elevated temperature in the presence of a volatile agent capable of reacting with the hydrogen fluoride formed, thereby forming aluminum chloride and volatilizing the latter substantially free of iron compounds.

18. The method of producing aluminum chloride from material containing aluminum oxide, silica and iron impurities, which consists in reacting on said material with ammonium fluoride to form ammonia-silicon-fluorine compounds and aluminum fluoride, heating the mixture to volatilize the ammonia-silicon-fluorine compounds, heating the residual fluorine compounds in a reducing atmosphere to reduce the ferric iron content thereof, and thereupon treating them with hydrogen chloride at an elevated temperature in the presence of an agent capable of reacting with the hydrogen fluoride formed, thereby converting the aluminum fluoride into aluminum chloride.

19. The method of producing a substantially iron-free aluminum chloride from materials containing oxides of silicon and aluminum and iron impurities which comprises treating said material with ammonium fluoride, heating the mixture to produce ammonia-silicon-fluorine compounds and metallic fluorides and to volatilize the ammonia-silicon-fluorine compounds from the metallic fluorides, further heating the mixture in the presence of a reducing atmosphere to reduce the ferric iron compounds present, and thereupon treating them with hydrogen chloride at an elevated temperature in the presence of a volatile agent capable of reacting with the hydrogen fluoride formed, thereby converting the metallic fluorides into chlorides and separating the aluminum chloride from the other chlorides by distillation.

20. The method of producing a purified anhydrous aluminum chloride from material containing iron and aluminum which comprises subjecting the material to the action of a reactive fluoride to convert the metallic content thereof to fluorides, heating the converted material in the presence of an anhydrous reducing agent and treating it with hydrogen chloride and ammonia at a temperature of at least about 400° C., thereby forming aluminum chloride and volatilizing the latter substantially free of iron compounds.

21. The method of producing aluminum chloride from material containing aluminum oxide, silica and iron impurities, which consists in reacting on said material with ammonium fluoride to form ammonia-silicon-fluorine compounds and aluminum fluoride, heating the mixture to volatilize the ammonia-silicon-fluorine compounds, heating the residual fluorine compounds in a reducing atmosphere to reduce the ferric iron content thereof, and treating the residual compounds with hydrogen chloride and ammonia at a temperature of at least about 400° C., thereby converting the aluminum fluoride into aluminum chloride.

In testimony whereof I have hereunto set my hand this 4th day of April, 1927.

SVEND S. SVENDSEN.